Nov. 10, 1942.　　　　G. D. JOHNSON　　　　2,301,625
SAFETY CLAMP
Filed April 9, 1941　　　　2 Sheets-Sheet 1
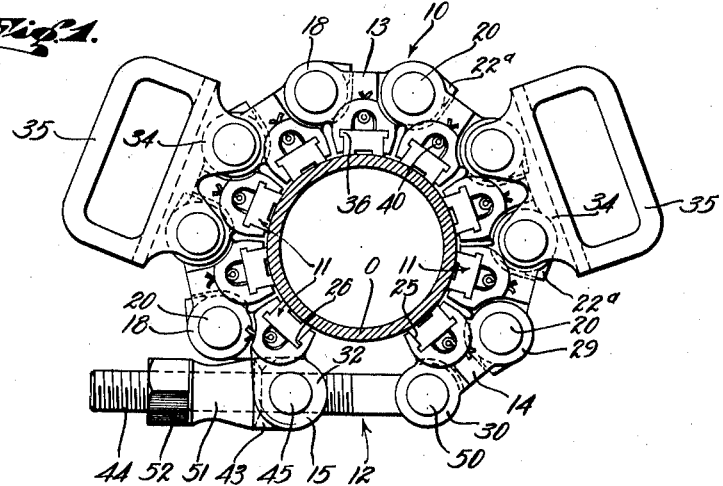
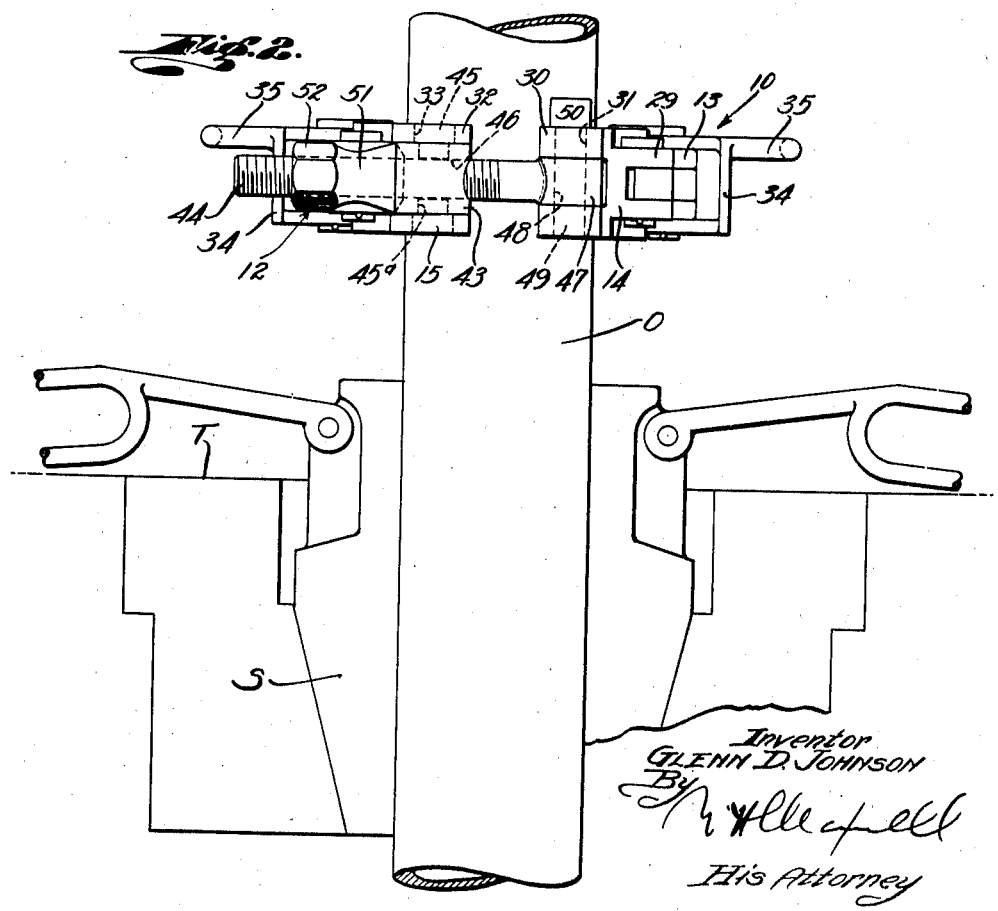
Inventor
GLENN D. JOHNSON
By
His Attorney

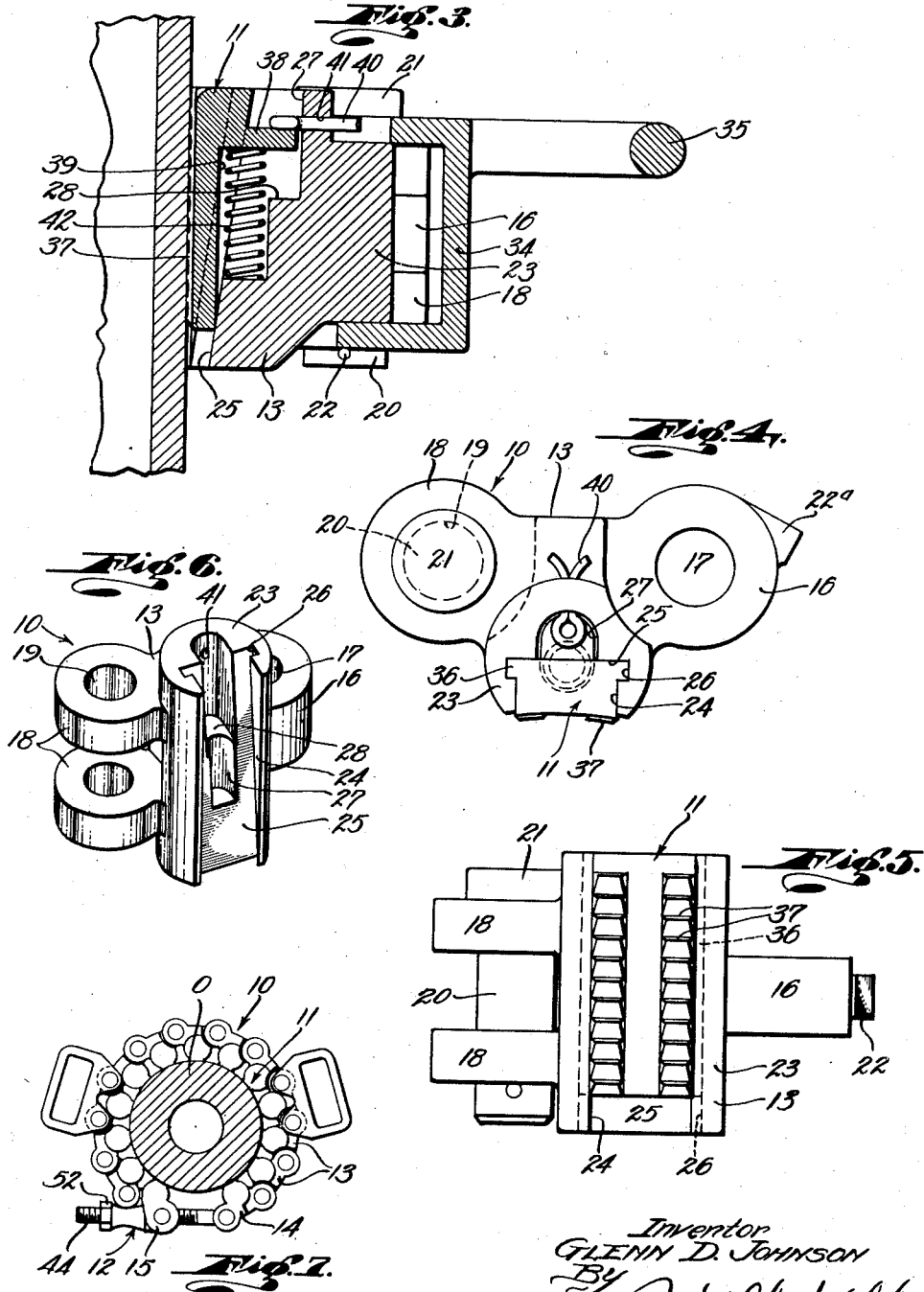

Patented Nov. 10, 1942

2,301,625

UNITED STATES PATENT OFFICE 2,301,625

SAFETY CLAMP

Glenn D. Johnson, Compton, Calif., assignor to Baash-Ross Tool Company, Los Angeles, Calif., a corporation of California Application April 9, 1941, Serial No. 387,563

11 Claims. (Cl. 24—263)

This invention has to do with well drilling tools and has particular reference to safety clamps for preventing the dropping and loss of drill pipe, drill collars, and the like, when handling the same at the rotary table. A general object of this invention is to provide a practical, effective, and dependable safety clamp.

In running in and removing well drilling strings, production strings, etc., there is always the possibility and danger that the slips in the rotary table will fail to obtain an effective grip. When flush joint drill pipe, stream lined drill collars, flush joint liners, and other smooth, flush joint pipe are being handled such failure of the slips may allow the pipe, liner or other object to fall into the well, necessitating an expensive, time consuming fishing operation for its recovery.

Another object of this invention is to provide a safety clamp that may be quickly engaged about the pipe, drill collar or other object, at a point above the rotary table and that is adapted to engage down against the slips or other parts at the rotary table to prevent the falling and loss of the pipe or object in the event the rotary table slips fail to support the pipe or object.

Another object of this invention is to provide a safety clamp of the character referred to that is operable to obtain a dependable, positive grip on the pipe, drill collar, liner, or the like, even when the latter presents a smooth surface devoid of shoulders, collars and recesses.

Another object of this invention is to provide a safety clamp of the character referred to that accurately conforms to the pipe, drill collar or other object, serving to grip the object at closely spaced points throughout its circumference even though the object may be out of round.

Another and important object of the invention is to provide a safety clamp of the character mentioned that may be easily and quickly adjusted in effective diameter throughout a substantial range to adapt it for use on pipe, and the like, through a wide range of sizes.

A further object of this invention is to provide a safety clamp which embodies a minimum number of simple sturdy parts.

The various objects and features of my invention will be fully understood from the following detailed description of the invention, throughout which description reference is made to the accompanying drawings, in which:

Fig. 1 is a plan view of the safety clamp of this invention engaged about a drill pipe, or like object, showing the object in horizontal cross section. Fig. 2 is a side elevation of the clamp and a portion of the object showing the clamp spaced above the slips of the rotary table. Fig. 3 is an enlarged vertical detailed sectional view taken through one of the intermediate links and a handle showing the link slip engaged with the pipe or object. Fig. 4 is a plan view of one of the intermediate link assemblies. Fig. 5 is a view of the inner side of one of the intermediate link assemblies. Fig. 6 is a perspective view of one of the intermediate links and Fig. 7 is a reduced plan view illustrating the clamp engaged about a larger object.

The safety clamp of the present invention may be said to comprise, generally, a plurality of pivotally connected links forming a link assembly 10, slips 11 carried by the links for gripping the pipe or object O, and releasable means 12 for connecting the ends of the link assembly 10 to hold it engaged about the object O.

The link assembly 10, when its ends are connected by the means 12, forms a substantially annular structure for fitting about the pipe or object O and, in accordance with the invention, may be readily varied as to its length or diameter to fit pipe and like objects varying greatly in diameter. The assembly 10 comprises a plurality of intermediate links 13, a right end link 14 and a left end link 15. The intermediate links 13 are preferably identical and the number employed depends upon the size of the pipe being handled. One end of each intermediate link 13 has a horizontally projecting lug or eye 16 provided with a vertical opening 17. The other end of each intermediate link 13 has a horizontally projecting fork or yoke 18 comprising vertically spaced ears or lugs. The yokes 18 are adapted to receive the eyes 16 of adjacent links 13 and have vertical openings 19 for registering with the opening 17 of the eyes. Hinge pins 20 are passed through the openings 17 and 19 of the fitted together eyes and yokes to releasably pivotally connect the links 13. The upper ends of the pins 20 have heads 21 which prevent downward movement of the pins and cotter keys 22 are passed through openings in the lower portions of the pins to prevent upward movement and displacement. Each tongue or eye 16 has a stop 22ª projecting from its periphery or edge for cooperating with the adjacent link 13 to limit the relative outward pivoting of the links. As illustrated, the eyes 16 and yokes 18 are quite thick and heavy to have the required strength.

The links 13 have intermediate portions 23 designed to receive and mount the slips 11. The intermediate portions 23 project inwardly at the inner sides of the links 13 and are in the form of upright, generally cylindrical, hubs or bosses. The inner sides of the portions 23 have vertical guide ways 24. There is preferably a single guide way 24 in each link 13. The side walls of the guide ways 24 are straight and parallel, while the rear walls 25 are flat and slope downwardly and inwardly relative to the central vertical axis of the link assembly and object O. Flat walled grooves 26 occur in the side walls of the guide ways 24 where they join the rear walls 25. The grooves 26 slope downwardly and inwardly and are open at the tops of the portions 23. Vertical slots or recesses 27 are provided in the sloping rear walls 25. The recesses 27 extend downwardly from the tops of the portions 23 and terminate before reaching the lower ends of the portions. As best illustrated in Figs. 3 and 6, the recesses 27 are graduated or stepped, that is, they are deeper at their upper portions to leave or provide upwardly facing shoulders 28 spaced above their lower ends.

The end links 14 and 15 occur at the ends of the link assembly 10 and are formed to receive and carry cooperating elements of the means 12. The end link 14 is similar, generally, to the intermediate links 13 being provided at one end with a fork or yoke 29 for receiving the eye 16 of the adjacent link 13 and provided with a vertical opening for receiving a hinge pin 20. The link 14 includes a body portion 23 provided with a guide way 25 having grooves 26 and a recess 27 as found in the intermediate links 13. The free or outer end of the link 14 has a pair of vertically spaced lugs 30. The lugs 30 have vertical openings 31 and are spaced apart vertically a substantial distance. The left end link 15 is provided at its inner end with a tongue or eye 16 received in the yoke 18 of the adjacent link 13 and is pivotally connected with the link 13 by a hinge pin 20 passed through the openings of the yoke and eye. The inner side of the link 15 has a portion 23 provided with the guide way 25, the grooves 26 and the recess 27 as found in the other links of the assembly. The free or outer end of the link 15 has a pair of vertically spaced lugs 32 similar to the lugs 31 and provided with vertical openings 33.

The link assembly 10 is preferably provided with handles to facilitate the handling and manipulation of the safety clamp. In the construction illustrated there are two like handles each having a channel 34 freely fitting about the exterior of the assembly 10 and arranged so that its flanges engage the upper and lower sides of the assembly. The flanges of the channels 34 have openings for registering with the openings 19 of the links 13 and adapted to receive the hinge pins 20. Thus, the hinge pins 20 serve to secure the handles to the assembly 10. Suitable handle grips 35 extend outwardly from the channels 34. It is to be observed that the handles just described do not require the employment of special links or special means of attachment.

The slips 11 are carried by the several links of the assembly 10 and are operable to grip the object O to stop or prevent downward movement of the object through the clamp. There is a slip 11 carried by each link 13, 14 and 15 and the several slips are preferably identical. The gripping slips 11 are vertical elongated wedge parts operating in the guide ways 24 of the links. The opposite sides of the slips 11 are flat and vertical to ride on the side walls of the guide ways 24 and the rear surfaces of the slips are flat and are pitched downwardly and inwardly to slidably bear on the walls 24. The opposite sides or edges of the slips 11 have longitudinal ribs or keys 36 slidably fitting the grooves 26. The keys 36 guide the slips 11 and hold them in engagement with the sloping walls 25. The exposed or active faces of the slips 11 are substantially vertical and are slightly concave to generally correspond to the curvature of the object O. Wickers or teeth 37 are provided on the active faces of the slips 11. The teeth 37 slope or face upwardly and inwardly to effectively and dependably grip the object O when the same tends to move downwardly through the clamp. In the embodiment of the invention disclosed there are two vertical rows of teeth 37 on each slip.

In accordance with the invention the slips 11 are spring held or spring urged being yieldingly held in raised positions where they have only initial cooperation with the object O. Fingers 38 project horizontally from the backs of the slips 11 and are received in the deepened upper portions of the recesses 27. The bodies of the slips 11 may be cut away below the fingers 38 to increase the extent of the lower sides of the fingers. It is preferred to cut away the slip bodies to leave or provide vertical grooves 39 in the backs of the slips which register with the recesses 27. Cotter keys 40 are passed outwardly through horizontal openings 41 in the rear walls of the portions 23 and are engageable by the fingers 38 to limit the upward movement of the slips 11. Coiled springs 42 are arranged under compression between the lower walls of the recesses 27 and the under sides of the fingers 38 to urge the slips 11 upwardly. The springs 42 initially or normally hold the slips 11 in their raised positions where the fingers 38 engage against the cotter keys 40 and the springs are yieldable to permit substantial downward movement of the slips relative to their links 13, 14 and 15. The recesses 27 and the grooves 39 guide and retain the vertically disposed springs 42.

The parts are formed and related so that the slips 11 project from the inner sides of their respective links 13, 14 and 15 to engage or grip the object O when in their uppermost positions with their fingers 38 engaged against the keys 40. The fingers 38 have substantial vertical movement in the recesses 27 whereby the slips 11 may have initial cooperation with objects O varying one inch or more in external diameter without the addition or removal of links of the assembly 10. The initial engagement of the slips 11 with the smaller objects O within such a range (one inch or more), may hold the slips in positions where their fingers 38 are slightly below the cotter keys 40.

The means 12 may be easily and quickly operated to connect the ends of the link assembly 10 to have the assembly engage about the object O so that the slips 11 obtain an initial gripping engagement with the object. The means 12 includes a pivot block 43 pivotally secured between the lugs 32 of the link 15 and a screw 44 carried by the link 13 and passing through the block. Pins or screws 45 are engaged or passed through the openings 33 of the lugs 32 and are threaded in openings 45ª in the upper and lower ends of the block 43 to retain the block for pivoting about a vertical axis. The block 43 has a horizontal opening 46 freely passing the screw 44. The screw 44 is adapted to be releasably connected with the end link 14. An eye 47 is formed on the inner end of the screw 44 and is adapted to be inserted between the lugs 30. The eye 47 has a vertical opening 48 adapted to be brought into registration with the openings 31 and a pin 49 is passed through the openings 31 and 48 to pivotally secure the pin 44 to the link 14. A head 50 on the upper end of the pin 49 prevents displacement of the pin.

The screw 44 passes through the opening 46 of the block 43 with suitable clearance and extends a considerable distance beyond the block. A nut 51 is threaded on the projecting portion of the screw 44 and is adapted to react against the pivot block 43 to draw the assembly 10 about the object O. The nut 51 is provided with a polygonal portion 52 readily engageable by a wrench or the like. Prior to the assembling of the clamp about the object O the screw 44 is carried by the block 43 and is free of the link 14. The eye 47 and the nut 51 prevent detachment of the screw from the block 43. When the clamp has been assembled about the object O the eye 47 of the screw is entered between the lugs 30 and the pin 49 is passed through the openings 31 and 48 to connect the opposite ends of the assembly 10. The nut 51 is then threaded inwardly against the block 43 to tighten the assembly 10 to the desired degree.

In accordance with the invention the links 13 are proportioned so that the addition or removal of a link 13 produces a known or definite change in the effective gripping diameter of the clamp. For example, the links 13 or certain of them, may be proportioned so that the addition of one link 13 will increase the effective gripping diameter of the clamp one inch and conversely the removal of one link will reduce the effective diameter of the clamp one inch. This proportioning of the parts and the vertical range of action of the slips 11 are such that the safety clamp may be easily and quickly conditioned to handle or grip pipe, or the like, within the full range of the pipe employed at the well. In a typical case, the links and other parts are proportioned so that the embodiment of a total of seven links 13, 14, 15 in the assembly 10 adapts the clamp for the effective gripping of pipe ranging from 3¾ inches to 4⅝ inches in external diameter, the embodiment of a total number of eight links adapts the clamp to grip pipe ranging from 4½ to 5⅝ inches in external diameter, the embodiment of a total number of nine links adapts the clamp to grip pipe ranging from 5½ to 6⅝ inches in external diameter, the embodiment of a total number of ten links adapts the clamp to handle pipe ranging from 6½ to 7⅝ inches in external diameter, and so on to handle the largest of the pipe that may be used.

Fig. 1 of the drawings shows the clamp equipped with a total number of nine links 13, 14 and 15 for engaging a medium size pipe or object O, while Fig. 7 shows the clamp provided with a total of thirteen links for gripping a larger object O. The construction is such that links 13 may be easily and quickly added to and removed from the assembly. One of the end links, say the link 14, is quickly disconnected from the assembly by removing the hinge pin 20 at its inner end and this exposes the end of the assembly of intermediate links 13 for the removal or addition of links as may be required. Additional links may be quickly secured to the assembly by means of the hinge pins 20 and the hinge pins are readily removed to permit the disconnection of links. Each link 13 is a complete unit equipped with a slip 11 and the adjustment of the clamp for the gripping of objects of different sizes requires merely the addition or removal of these complete assemblies. The safety clamp may be delivered or supplied to the well with a full set of links 13 so that the safety clamp will be available for use on pipe, liners, drill collars, etc., of all sizes.

In employing the safety clamp the assembly 10 is provided with the correct total number of links 13, 14 and 15 to adapt it for gripping the particular pipe, liner, or other object O being handled at the derrick. The assembly 10 is then engaged about the object O a short distance above the rotary table T and its end links 14 and 15 are connected by the means 12 as described above. Fig. 2 of the drawings shows the safety clamp engaged about the object O above the rotary table T. The nut 51 is given a few turns to tighten the assembly 10 about the object. The engagement of the slips 11 with the object O will hold the safety clamp against movement along the object. In the event the rotary table slips S, or other pipe gripping means of the drilling rig, fail when making up or disconnecting the drilling string, the object O may start to fall into the well. The safety clamp engaged about the object O moves downwardly with the object until it strikes the slips S or other part at the table T. When the safety clamp comes to rest against the slips S of the table T its downward movement is stopped and the object O tends to move downwardly through the safety clamp. The spring held slips 11 engaged with the object O ride downwardly on the walls 25 and are thus forced into tighter engagement with the object. The slips 11 are very securely and dependently engaged with the object O by the downward movement of the object or by the weight of the object, or both, and positively prevent the object from falling into the well. With the pipe or object O stopped and held by the safety clamp suitable steps may be taken to reengage the object and raise it for further operations.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. A clamp of the character described comprising a multiplicity of like intermediate links, two end links, means for pivotally connecting the links to form a continuous assembly with the end links at the ends of the assembly, means on the end links for connecting the ends of the assembly whereby the assembly may be arranged around a pipe or like object, and shiftable slips carried by each link for gripping the object.

2. A clamp of the character described comprising a multiplicity of like intermediate links, two end links, means for pivotally connecting the links to form a continuous assembly with the end links at the ends of the assembly, means on the end links for connecting the ends of the assembly whereby the assembly may be arranged around a pipe or like object, a shiftable gripping slip for each link, and spring means for supporting the slips on their links.

3. A clamp of the character described comprising a multiplicity of identical links pivotally connected to form an assembly adapted to be arranged around a pipe or like object, means at the ends of the assembly for joining said ends to hold the assembly around the object, at least one of said means being detachable from the link assembly, and a spring loaded slip on each link for gripping the object.

4. A clamp of the character described comprising a multiplicity of identical links pivotally connected to form an assembly adapted to be arranged around a pipe or like object, means at the ends of the assembly for joining said ends to hold the assembly around the object, at least one of said means being detachable from the link assembly whereby the number of said links may be easily changed to adapt the essembly for engaging around objects of different diameter, and a slip carried by each link for gripping the object.

5. A clamp of the character described comprising a plurality of links, means for detachably pivotally connecting the links to form an assembly adapted to be engaged around objects, each link being proportioned to add approximately one inch to the effective gripping diameter of the assembly, object gripping slips on the links, and means for connecting the ends of the assembly.

6. A clamp of the character described comprising a plurality of links, means for detachably pivotally connecting the links to form an assembly adapted to be engaged around objects, each link being proportioned to increase the effective diameter of the assembly a given amount, a gripping slip shiftable vertically on each link and movable inwardly upon downward shifting, spring means urging the slips upwardly, and means for releasably connecting the ends of the assembly.

7. A clamp of the character described comprising a plurality of links, means for detachably pivotally connecting the links to form an assembly adapted to be engaged around objects, each link being proportioned to increase the effective diameter of the assembly a given amount whereby the clamp may be used on objects of larger and smaller diameter by increasing or decreasing the number of links in said assembly, a gripping slip shiftably vertically on each link, and movable inwardly upon downward shifting, spring means urging the slips upwardly, and means for releasably connecting the ends of the assembly to hold the slips in initial gripping engagement with the object including a member detachably secured to one end of the assembly, a member on the other end of the assembly, and a screw threaded part on one member cooperable with the other member.

8. A clamp of the character described comprising a plurality of links, means for detachably pivotally connecting the links to form an assembly adapted to be engaged around objects, each link being proportioned to increase the effective diameter of the assembly a given amount whereby the clamp may be used on objects of larger and smaller diameter by increasing or decreasing the number of links in said assembly, a gripping slip shiftably vertically on each link, and movable inwardly upon downward shifting, spring means urging the slips upwardly, and means for releasably connecting the ends of the assembly to hold the slips in initial gripping engagement with the object including a member detachably secured to one end of the assembly, a member on the other end of the assembly, a screw shiftably carried by one of said members, means for detachably connecting the screw with the other member, and a nut on the screw for tightening the assembly about the object.

9. A clamp of the character described comprising a multiplicity of like intermediate links, two end links, means for pivotally connecting the links to form a continuous assembly with the end links at the ends of the assembly, each link having a guideway with a sloping wall, slips in the guideways forced inwardly against the object through cooperation with the sloping walls upon downward movement, springs for urging the slips upwardly, and means on the end links for releasably connecting the ends of the assembly and operable to tighten the assembly about the object so that the slips obtain initial engagement with the object.

10. A clamp of the character described comprising a multiplicity of like intermediate links, two end links, means for pivotally connecting the links to form a continuous assembly with the end links at the ends of the assembly, each link having a guideway with a sloping wall and a recess, slips in the guideways forced inwardly against the object through contact with said walls upon downward movement, fingers on the slips entering the recesses, springs in the recesses acting on the fingers to urge the slips upwardly, and means on the end links for releasably connecting the ends of the assembly and operable to tighten the assembly onto the object so that the slips have initial cooperation with the object.

11. A clamp of the character described comprising a multiplicity of like intermediate links, two end links, means for pivotally connecting the links to form a continuous assembly with the end links at the ends of the assembly, each link having a guideway with a sloping wall and a recess, slips in the guideways forced inwardly against the object through contact with said walls upon downward movement, fingers on the slips entering the recesses, springs in the recesses acting on the fingers to urge the slips upwardly, keys on the links engaged by the fingers to limit the upward movement of the slips and removable to allow removal of the slips, and means on the end links for releasably connecting the ends of the assembly and operable to tighten the assembly onto the object so that the slips have initial cooperation with the object.

GLENN D. JOHNSON.